Patented June 16, 1953

2,642,427

UNITED STATES PATENT OFFICE 2,642,427

PIPERAZINE SALTS OF CYCLOPENTANO-POLYHYDROPHENANTHRENE-3-MONO-SULFATES

Richard B. Hasbrouck, Waukegan, Ill., assignor to Abbott Laboratories, North Chicago, Ill., a corporation of Illinois No Drawing. Application August 1, 1951, Serial No. 239,857

10 Claims. (Cl. 260—239.5)

This invention relates to therapeutic preparations having hormone activity, and includes among its objects and advantages, compounds of increased stability, and methods for producing the same. Specifically, the invention relates to piperazine salts of the half acid sulfate esters of cyclopentanopolyhydrophenanthrenes.

The compounds of the present invention are derived from hormone type steroids known as the cyclopentanopolyhydrophenanthrene series, which includes estrogenic steroids, such as estrone, estradiol, equilin, and equilenin; androsterones; pregnenolones; stereo-isomerides and derivatives thereof, etc.

According to the invention, stable organic salts of the cyclopentanopolyhydrophenanthrenes are produced, which are particularly suitable for oral administration. The salts are odorless, or practically so, and inoffensive to the user. The salts are soluble in aqueous media and are stable therein.

Butenandt, Z. Physiol. Chem. 259, 222–34 (1939), during an investigation of estrone, prepared several alkaloid salts of estrone sulfate. The salts are quite insoluble in aqueous solutions and are not, therefore, particularly adapted for human consumption. A further disadvantage of these estrone salts if used for medication, is the fact that if any dissociation takes place in the solution, the alkaloids thus liberated from the compounds produce the general alkaloid effects, which are undesirable. Some of the alkaloids used to produce the salts are extremely toxic or poisonous and therefore, impractical for use.

Generally, the compounds of my invention may be prepared from the known naturally occurring sodium steroid 3-monosulfates or from the steroids per se. The steroids may be sulfonated according to known procedures with such sulfonating agents as sulfur trioxide, chlorosulfonic acid, sulfamic acid, etc., and recovered as water-soluble salts, such as, sodium, ammonium, or other alkali or alkali metal salts. The salt is then reacted with piperazine (or a piperazine salt) to produce the desired piperazine cyclopentanopolyhydrophenanthrene-3-monosulfate.

The following examples illustrate in detail the present invention.

Example I

About 10 parts (by weight) of estrone and about 10.8 parts of sulfamic acid are placed in a suitable reaction vessel such as an ordinary round-bottomed glass flask, with about 40 parts of pyridine. Dimethylaniline may be substituted for the pyridine. The mixture is heated, with stirring, to about 95–100° C., and the heating is continued for about one and one-quarter hours. At the end of the heating period the reaction mass is cooled to about room temperature and about 70 parts of anhydrous ether is added. The dense, pink, granular solid which forms is filtered and washed with anhydrous ether. The solid, which is a mixture of ammonium estrone-3-monosulfate and pyridine sulfamate, is dried.

About 24 parts of piperazine hexahydrate (or an equivalent amount of anhydrous piperazine) dissolved in a solution of about 125 parts of methanol and 40 parts of water, is added to the crude ammonium estrone-3-monosulfate. The pH is adjusted to 8–8.5 with more of the piperazine, and the mixture is gently heated until solution is effected. The solution is evaporated to dryness, to remove the last traces of water. The dried residue is extracted with about 200 parts of methanol, by slurrying the solid in the methanol and filtering. The methanol extract is clarified with decolorizing charcoal, and partially concentrated. About 400 parts of anhydrous ether are added with stirring to the concentrated methanol solution, precipitating the piperazine estrone-3-monosulfate as light tan crystals. The crystals are dried in vacuum. When recrystallized from methanol the product melts at 193–195° C.

In the example the sulfamic acid is used in a 3-molar excess to the estrone, to insure a high yield of the ammonium estrone sulfate. The excess sulfamic acid is converted to pyridine sulfamate.

The ammonium estrone sulfate is a very desirable intermediate in the process, as the ammonium group may be replaced by the piperazine group. It is important that the basic group of the intermediate salt of the estrone sulfate be less basic than the piperazine, otherwise no reaction will occur between the two compounds.

Example II

To a solution of 0.650 gm. of piperazine hexahydrate in 5 cc. of methanol is added 0.275 gm. of ammonium estradiol-3-monosulfate. The mixture is warmed gently to dissolve the solids. It is then concentrated to dryness in vacuum. The residue is stirred with about 10 cc. of methanol at 40–50° for about one hour. The solution is filtered and the residue washed with a small amount of methanol. About 30 cc. of anhydrous ether is added gradually to the methanol solution. The product, piperazine estradiol-3-monosulfate, precipitates as light tan crystals, melting point is 188° C.

Example III

Piperazine estradiol-3-monosulfate may also be prepared by the hydrogenation of piperazine estrone sulfate as follows:

A solution of 0.9 gm. of piperazine estrone-3-monosulfate and 0.750 gm. of piperazine hexahydrate dissolved in 70 cc. of methanol is hydrogenated at 20 lbs. hydrogen pressure in the presence of 0.15 gm. of prehydrogenated platinum oxide catalyst. After the hydrogen adsorption is complete, the catalyst is removed by filtration, and the filtrate is concentrated under reduced pressure until crystallization starts. About 10 volumes of anhydrous ether is then slowly added to complete the crystallization. The resulting piperazine estradiol-3-monosulfate is recovered by filtration, washed with ether and dried.

Example IV

To a solution of 0.500 gm. of piperazine hexahydrate in 5 cc. of methanol is added 0.200 gm. of ammonium equilin-3-monosulfate. The mixture is warmed gently to effect solution and then concentrated to dryness in vacuum. The residue is extracted with 10 cc. of methanol at 40–50° for about one hour, and then filtered. The filtrate is treated with about 30 cc. of ether, added gradually. The product, piperazine equilin-3-monosulfate, precipitates as a light tan powder.

Example V

To a solution of 0.600 gm. piperazine hexahydrate in 5 cc. of methanol is added 0.225 gm. of ammonium equilenin-3-monosulfate. The mixture is warmed gently to cause solution to take place. It is then concentrated to dryness in vacuum. The residue is stirred with about 10 cc. of methanol for about an hour and then filtered. To the filtrate is added gradually about 30 cc. of ether. The product, piperazine equilenin-3-monosulfate, precipitates as nearly white, small crystals.

This application is a continuation-in-part of my copending application Serial No. 103,968, filed July 9, 1949, now abandoned, entitled "Therapeutic Compounds."

Others may readily adapt the invention for use under various conditions of service, by employing one or more of the novel features disclosed or equivalents thereof. As at present advised with respect to the apparent scope of my invention, I desire to claim the following subject matter.

I claim:

1. A therapeutic compound selected from the group consisting of piperazine estrone-3-monosulfate, piperazine estradiol-3-monosulfate, piperazine equilin-3-monosulfate and piperazine equilenin-3-monosulfate.

2. Piperazine estrone-3-monosulfate.

3. Piperazine estradiol-3-monosulfate.

4. Piperazine equilin-3-monosulfate.

5. Piperazine equilenin-3-monosulfate.

6. The process which comprises reacting a salt of a member of the group consisting of estrone-3-monosulfate, estradiol-3-monosulfate, equilin-3-monosulfate and equilenin-3-monosulfate with piperazine.

7. The process which comprises, reacting ammonium estrone-3-monosulfate with piperazine to produce piperazine estrone-3-monosulfate.

8. The process which comprises, reacting ammonium estradiol-3-monosulfate with piperazine to produce piperazine estradiol-3-monosulfate.

9. The process which comprises, reacting ammonium equilin-3-monosulfate with piperazine to produce piperazine equilin-3-monosulfate.

10. The process which comprises, reacting ammonium equilenin-3-monosulfate with piperazine to produce piperazine equilenin-3-monosulfate.

RICHARD B. HASBROUCK.

References Cited in the file of this patent

Butenandt, Zeit. Physiol. Chem. 259, pp. 222–234 (1939).